(12) United States Patent
Turner

(10) Patent No.: US 10,947,011 B2
(45) Date of Patent: Mar. 16, 2021

(54) DRINKING OR EATING VESSEL

(71) Applicant: AT PROMOTIONS LTD, King's Lynn (GB)

(72) Inventor: Alexander Edward Turner, Great Massingham (GB)

(73) Assignee: AT Promotions LTD, King's Lynn (GB)

( * ) Notice: Subject to any disclaimer, the term of this patent is extended or adjusted under 35 U.S.C. 154(b) by 0 days.

(21) Appl. No.: 15/539,062

(22) PCT Filed: Dec. 22, 2015

(86) PCT No.: PCT/GB2015/054134
§ 371 (c)(1),
(2) Date: Jun. 22, 2017

(87) PCT Pub. No.: WO2016/102963
PCT Pub. Date: Jun. 30, 2016

(65) Prior Publication Data
US 2019/0031400 A1    Jan. 31, 2019

Related U.S. Application Data

(60) Provisional application No. 62/095,652, filed on Dec. 22, 2014.

(51) Int. Cl.
| | | |
|---|---|---|
| *B65D 25/34* | (2006.01) | |
| *A47G 19/12* | (2006.01) | |
| *A47G 19/02* | (2006.01) | |
| *C09D 133/00* | (2006.01) | |
| *C09D 163/00* | (2006.01) | |
| *C09D 175/04* | (2006.01) | |
| *A47G 19/22* | (2006.01) | |
| *C09D 133/06* | (2006.01) | |
| *C08G 18/80* | (2006.01) | |
| *B41M 5/00* | (2006.01) | |
| *A47G 19/00* | (2006.01) | |
| *C08G 18/58* | (2006.01) | |
| *B05D 1/02* | (2006.01) | |
| *B05D 1/18* | (2006.01) | |
| *B05D 3/02* | (2006.01) | |
| *B41M 5/035* | (2006.01) | |
| *B41M 5/52* | (2006.01) | |
| *C09D 7/40* | (2018.01) | |

(52) U.S. Cl.
CPC .............. *B65D 25/34* (2013.01); *A47G 19/00* (2013.01); *A47G 19/02* (2013.01); *A47G 19/12* (2013.01); *A47G 19/22* (2013.01); *A47G 19/2205* (2013.01); *B05D 1/02* (2013.01); *B05D 1/18* (2013.01); *B05D 3/0254* (2013.01); *B41M 5/0094* (2013.01); *B41M 5/035* (2013.01); *C08G 18/58* (2013.01); *C08G 18/8077* (2013.01); *C09D 133/00* (2013.01); *C09D 133/06* (2013.01); *C09D 163/00* (2013.01); *C09D 175/04* (2013.01); *B41M 5/5218* (2013.01); *B41M 5/5254* (2013.01); *B41M 5/5281* (2013.01); *C08G 2390/40* (2013.01); *C09D 7/40* (2018.01); *Y10T 428/131* (2015.01); *Y10T 428/1317* (2015.01); *Y10T 428/1352* (2015.01)

(58) Field of Classification Search
CPC ........ B65D 25/34; B05D 3/0254; B05D 1/18; B05D 1/02; A47G 19/2205; A47G 19/02; A47G 19/00; A47G 19/12; A47G 19/22; B41M 5/035; B41M 5/0094; B41M 5/5218; B41M 5/5281; B41M 5/5254; C09D 133/06; C09D 133/00; C09D 163/00; C09D 175/04; C09D 7/40; C08G 18/58; C08G 18/8077; C08G 2390/40; Y10T 428/1317; Y10T 428/1352; Y10T 428/131
See application file for complete search history.

(56) References Cited

U.S. PATENT DOCUMENTS

| | | | |
|---|---|---|---|
| 4,943,684 A | 7/1990 | Kramer | |
| 4,966,815 A | 10/1990 | Hare | |
| 4,989,508 A | 2/1991 | King | |
| 4,993,987 A | 2/1991 | Hull et al. | |
| 5,246,518 A | 9/1993 | Hale | |

(Continued)

FOREIGN PATENT DOCUMENTS

| | | |
|---|---|---|
| CN | 101305884 | 11/2008 |
| CN | 201542291 | 8/2010 |

(Continued)

OTHER PUBLICATIONS

US 10,189,606 B2, 01/2019, Turner (withdrawn)

(Continued)

*Primary Examiner* — James C Yager
(74) *Attorney, Agent, or Firm* — Evan Law Group LLC

(57) ABSTRACT

There is provided a drinking or eating vessel comprising an inner surface that defines a volume for receiving liquid or solid food and an outer surface that supports a polymeric coating and a decorative layer; wherein the polymeric coating comprises a polymer formed by curing a coating mixture on the outer surface of the drinking or eating vessel, said coating mixture comprising a matting agent; wherein the polymeric coating has an inner surface in contact with the drinking or eating vessel and an outer surface exposed to contact by a user of the vessel; and wherein the decorative layer forms a diffuse layer within the polymeric coating. Also provided are corresponding processes for producing the drinking or eating vessel.

19 Claims, No Drawings

(56) References Cited

U.S. PATENT DOCUMENTS

| | | |
|---|---|---|
| 5,286,706 A | 2/1994 | Mochizuki et al. |
| 5,330,962 A | 7/1994 | De Brabandere et al. |
| 5,643,387 A | 7/1997 | Berghauser et al. |
| 5,944,931 A | 8/1999 | Cranford |
| 5,997,678 A | 12/1999 | Wess et al. |
| 6,217,694 B1 | 4/2001 | Taniguchi |
| 8,274,537 B2 | 9/2012 | Howell |
| 9,856,055 B2 | 1/2018 | Turner |
| 10,125,270 B2 | 11/2018 | Turner |
| 10,273,055 B2 | 4/2019 | Turner |
| 10,611,525 B2 | 4/2020 | Turner |
| 2005/0191569 A1 | 9/2005 | Aylward et al. |
| 2007/0048466 A1 | 3/2007 | Huynh |
| 2007/0141125 A1 | 6/2007 | Bourdelais et al. |
| 2011/0250405 A1 | 10/2011 | Sawatsky |
| 2014/0272438 A1 | 9/2014 | Posey |
| 2015/0291806 A1 | 10/2015 | Turner |
| 2016/0046835 A1 | 2/2016 | Ye et al. |
| 2017/0050766 A1 | 2/2017 | Turner |
| 2018/0155082 A1 | 6/2018 | Turner |
| 2019/0031400 A1 | 1/2019 | Turner |
| 2019/0161241 A1 | 5/2019 | Turner |
| 2019/0343309 A1 | 11/2019 | Darlow et al. |

FOREIGN PATENT DOCUMENTS

| | | |
|---|---|---|
| CN | 201612433 | 10/2010 |
| CN | 202009965 | 10/2011 |
| CN | 102774157 | 11/2012 |
| CN | 203168713 | 9/2013 |
| DE | 40 11 215 | 10/1990 |
| EP | 0 227 092 | 7/1987 |
| EP | 0 350 534 | 1/1990 |
| EP | 0 420 986 | 4/1991 |
| EP | 0 474 355 | 3/1992 |
| EP | 0 514 631 | 11/1992 |
| EP | 0 543 441 | 5/1993 |
| EP | 0 587 148 | 3/1994 |
| EP | 0 672 542 | 9/1995 |
| EP | 0 721 848 | 7/1996 |
| EP | 1 024 180 | 6/2000 |
| EP | 1344760 | 9/2003 |
| GB | 2484774 A | 4/2012 |
| JP | 5-278745 | 10/1993 |
| JP | 8-333139 | 12/1996 |
| JP | 2004123462 | 4/2004 |
| KR | 20010078990 | 8/2001 |
| KR | 20080079832 | 9/2008 |
| WO | 2000/53413 | 3/2000 |
| WO | 2007/021780 | 2/2007 |
| WO | 2007/027710 | 3/2007 |
| WO | 2009/053721 | 4/2009 |
| WO | 2009/138786 | 11/2009 |
| WO | 2013/160630 | 10/2013 |
| WO | 2015/166244 | 11/2015 |
| WO | 2016/102963 | 6/2016 |

OTHER PUBLICATIONS

Database WPI Accession No. 1997-095320, Jan. 3, 2013.
International Search Report dated Jan. 24, 2013 for PCT Application No. PCT/GB2012/050900, 3 pages.
GB Intellectual Property Office Search Report dated Jan. 10, 2012 for GB Application No. GB1115663.5, 2 pages.
GB Intellectual Property Office Search Report dated Oct. 20, 2014 for GB Application No. GB1407546.9, 5 pages.
International Search Report and Written Opinion dated Mar. 3, 2016 for PCT Application No. PCT/GB2015/054134, 10 pages.
European Community Design Registration No. 02305375-0001, (Sep. 9, 2013).
European Community Design Registration No. 02305375-0002, (Sep. 9, 2013).
European Community Design Registration No. 02305375-0003, (Sep. 9, 2013).
R16, 11, Mar. 20, 2018, U.S. Appl. No. 15/832,599, US.
R17, 4, May 1, 2018, U.S. Appl. No. 14/396,923, US.
R18, 17, May 22, 2018, 201580036558.8, CN.
R19, 14, Sep. 18, 2018, U.S. Appl. No. 15/832,599, US.
R20, 15, Dec. 5, 2018, 201580023617.8, CN.
U.S. Appl. No. 16/230,452, filed Nov. 28, 2018.
R22, 9, Feb. 7, 2019, U.S. Appl. No. 15/832,599, US.
R24, 18, Feb. 27, 2019, 201580036558.8, CN.
R25, 8, Sep. 29, 2015, PCT/GB2015/051252, PCT.
R26, 4, May 9, 2017, GB1700408.06, GB.
R27, 9, Mar. 25, 2019, PCT/GB2018/050056, PCT.
U.S. Appl. No. 16/477,161, filed Jul. 10, 2019, PCT/GB2018/050056, Jan. 10, 2018.
GB Intellectual Property Office Search Report dated May 9, 2017 for GB Application No. GB1700408.6, 4 pages.
International Search Report and Written Opinion dated Feb. 27, 2018 for PCT Application No. PCT/GB2018/050056, 15 pages.
R29, 12, Aug. 7, 2019, U.S. Appl. No. 16/203,452, US.
R31, 8, Nov. 15, 2019, U.S. Appl. No. 16/203,452, US.
R32, 8, Dec. 10, 2019, U.S. Appl. No. 16/477,161, US.
R34, 19, Mar. 16, 2020, U.S. Appl. No. 16/477,161, US.
R35, 129, Jun. 27, 2019, 15820582.3, EP.
R36, 37, Nov. 15, 2019, 15820582.3, EP.
R37, 8, Mar. 9, 2020, 15820582.3, EP.
Wang. S. (edited by) "Coating technology", Beijing Chemical Industry Press, vol. 3, pp. 330-343, (1996).
Notification of Reexamination of CN application No. 2015800365588 dated Nov. 2, 2020, with translation, 12 pages.
5 pages, dated Dec. 8, 2020, U.S. Appl. No. 16/477,161, U.S.
4 pages, dated Oct. 13, 2020, Application No. 15820582.3, EP.

DRINKING OR EATING VESSEL

The present invention relates to drinking or eating vessels having a decorative layer, and to processes for producing such vessels.

Drinking and eating vessels made from hard surface substrates such as ceramic or glass are often decorated, for example with a decorative pattern or image such as a graphic image or photographic image. Known decoration processes include silk screen printing, either directly to the substrate or via decals. However, these decoration processes require large runs to justify the set-up costs.

Decoration processes known in the art, such as those used to decorated a vessel with a photographic image, produce a decoration that is highly glossy in nature. This has a number of associated disadvantages: reflections from the glossy surface can be distracting to a user and make it difficult to see the decoration; the glossy surface may also lead to the decoration appearing distorted, and can reduce the quality of a photographic image reproduced on a vessel.

There is therefore a need for decorated drinking or eating vessels with improved decorative layers, and processes for their production.

The present invention addresses the above-described problem by providing drinking or eating vessels having a decorative layer, and processes for producing such vessels, according to the present claims.

In one aspect, the invention provides a drinking or eating vessel comprising an inner surface that defines a volume for receiving liquid or solid food and an outer surface that supports a polymeric coating and a decorative layer;
wherein the polymeric coating comprises a polymer formed by curing a coating mixture on the outer surface of the drinking or eating vessel, said coating mixture comprising a matting agent;
wherein the polymeric coating has an inner surface in contact with the drinking or eating vessel and an outer surface exposed to contact by a user of the vessel; and
wherein the decorative layer forms a diffuse layer within the polymeric coating.

The term "drinking or eating vessel" includes vessels such as cups, mugs, bowls, and plates. The term "drinking or eating vessel" also includes storage vessels (for example, bottles and jars) of the type from which food products may be directly consumed.

The drinking or eating vessel may be made of any suitable material known in the art and may be of any suitable shape and design known in the art. In one embodiment, the vessel is a ceramic vessel. By way of example, the vessel may be made from bone china, porcelain, earthenware or stoneware. In one embodiment, the vessel is a glass vessel. The drinking or eating vessel may also be made of metal, for example steel (e.g. stainless steel) or aluminium.

The vessel has an inner surface and an outer surface. The inner surface is found on the inside (during normal use) of the vessel, namely the portion in which liquid or solid food is received or held, or on which said food is supported. The outer surface is found on the external side (during normal use) of the vessel before any coating process of the invention has been applied. The outer surface includes the external surface provided by the body of a vessel and may include the external surface of any appendage (e.g. a handle) thereto.

In one embodiment, the drinking or eating vessel does not comprise an anti-microbial coating. In one embodiment, the polymeric coating of the drinking or eating vessel does not comprise any anti-microbial agent. In one embodiment, the polymeric coating of the drinking or eating vessel does not have anti-microbial properties.

The vessels of the invention have a polymeric coating. A coating is a layer of material that is applied onto a surface of the vessel. The polymeric coating may be applied to an outer surface of the vessel, or to an inner surface of the vessel, or to both an outer and an inner surface of the vessel.

The polymeric coating may be applied in any suitable and appropriate manner, for example by spray coating or by dip coating. Suitable spray coating processes include High Volume Low Pressure (HVLP) spray application.

The polymeric coating may be a white coating.

The polymeric coating may be a clear, colourless, transparent or translucent coating.

The polymeric coating of the vessel may be cured onto the outer surface (and/or inner surface) of the drinking vessel at a curing temperature of less than 600° C., for example less than 400° C. or less than 300° C. Suitable polymers are well known to a skilled person.

In one embodiment, the coating is a coating that is produced by curing at a temperature of 180-240° C.

"Cured" and "curing" refers to the chemical process of curing, via which process a composition (typically containing monomers or small polymers) hardens (for example, due to the formation of cross-linking) when exposed to heat, air, ultraviolet radiation, infrared radiation or chemical additives. Thus, the coating may be produced by curing a coating mixture to form a hardened coating.

Thus, in one embodiment, the polymeric coating is produced by applying a coating mixture to a vessel followed by curing of the coating mixture at a temperature conducive to coating formation. A "coating mixture" comprises (or consists of) the ingredients that cure to form a coating on a vessel.

In one embodiment, the polymeric coating comprises (or consists of): (i) a polymer formed at a curing temperature of less than 250° C., and (ii) a matting agent.

The polymer is a non-glass polymer.

For example, the coating may comprise (or consist of): (i) one or more of: a polyurethane (lacquer or paint), an epoxy (resin), a polyester, an acrylic, or mixtures thereof, and (ii) a matting agent. An epoxy may be a thermosetting copolymer that is formed by the reaction between an epoxide and a polyamine. The coatings may be provided as, for example, a water-based coating mixture or a solvent-based coating mixture.

In one embodiment, the coating comprises a cured polyurethane and/or a cured epoxy (resin). For example, the coating may comprise (or consist of): (i) polyurethane, and (ii) a matting agent. In one embodiment, the coating comprises (or consists of): (i) an epoxy, and (ii) a matting agent.

For example, the coating may comprise (or consist of): (i) a polymeric blocked aliphatic diisocyanate epoxy, or an aliphatic (acrylic) polyurethane, and (ii) a matting agent.

A typical epoxy (resin) composition may comprise (or consist of):

polyisocyanate (e.g. an aliphatic diisocyanate based polyisocyanate), for example 5-30 wt. %;

propylene glycol or ether acetate (e.g. a propylene glycol monomethyl ether acetate), for example 10-40 wt. %);

xylene (CAS No. 1330-20-7), for example 1-15 wt. %;

an organic solvent (e.g. solvent naptha), for example 1-10 wt. %;

an epoxy resin (for example, 5-20 wt. %).

Where wt. % values are indicated, said composition components add up to 100%.

An example of an epoxy (resin) composition comprises (or consists of):
methyl ethyl ketoxime-blocked aliphatic diisocyanate based polyisocyanate ≤30 wt %;
propylene glycol monomethyl ether acetate (CAS No. 108-65-6)≤40 wt %;
xylene (CAS No. 1330-20-7)≤15 wt %;
aromatic 100 (solvent naptha) (CAS No. 64742-95-6)≤10 wt %;
epoxy resin ≤20 wt %.

Where wt. % values are indicated, said composition components add up to 100%.

By way of specific example, reference is made to DuraGlaze™, which is a polymeric blocked aliphatic diisocyanate epoxy resin.

Thus, the coating may comprise (of consist of): (i) DuraGlaze™, and (ii) a matting agent.

A yet further example of an epoxy coating comprises (or consists of):
an ethanol component (e.g. 2-(2-butoxyethoxy)ethanol), e.g. 5-15 wt. %;
an organic solvent component (e.g. xylene), e.g. 25-50 wt. %;
a butanol component (e.g. n-butanol), e.g. 5-15 wt. %;
epoxy resin (e.g. number average molecular weight ≤700), e.g. >50 wt. %.

Where wt. % values are indicated, said composition components add up to 100%.

An example of a suitable epoxy coating is Ceraglaze S1475, which may be obtained from Neogene LLP, Watford, Hertfordshire, United Kingdom.

By way of example, epoxy coatings such as Ceraglaze S1475 typically cure in 8-14 minutes at a temperature of 180-240° C.

The coating may comprise an organic coating, such as a Transparent Stoving Finish (TSF). By way of example, a TSF may be a blend of polyurethane and epoxy resin.

A typical TSF may comprise (or consist of):
2-methoxy-1-methylethyl acetate (CAS No. 108-65-6) 5-15%;
n-butyl acetate (CAS No. 123-86-4) 5-15%;
xylene (CAS No. 1330-20-7) 25-50%;
ethylbenzene (CAS No. 100-41-4) 5-15%;
epoxy resin (number average molecular weight ≤700) (CAS No. 25068-38-6) 1-5%.

Where wt. % values are indicated, said composition components add up to 100%.

Commercially available examples of TSFs are available from Neogene LLP, Watford, Hertfordshire, United Kingdom, such as TSF product code S1805.

The coating may comprise (or consist of): (i) a polyester, and (ii) a matting agent.

Other coating materials may be employed and are well known to a skilled person.

The polymeric coating is not a glass layer. For example, the polymeric coating of the present invention is not one that is obtained by glazing, which refers to heating a coating mixture at a temperature greater than 650° C. (for example, 1210° C.).

The polymeric coating may be a coating which is resistant to damage when the coated vessel is washed (for example, by hand, or in a dishwasher). Examples of such coatings include polyurethane lacquers/paints, epoxy resins and polymeric blocked aliphatic diisocyanate epoxy resins (e.g. DuraGlaze™ as described above).

The polymeric coating of the drinking or eating vessels of the invention is formed by curing a coating mixture on the outer surface of the drinking or eating vessel, said coating mixture comprising a matting agent. The present inventors have found that providing a matting agent in the coating mixture produces a coated vessel that has a matt appearance and/or surface texture. Application of a decorative layer to such a coated vessel, wherein the decorative layer forms a diffuse layer within the polymeric coating, advantageously produces a decorated drinking or eating vessel where the decoration has a matt appearance and finish. This produces a sharp and clear decoration that is easy for a user to view, and which has few or no distortions. The matt finish enhances the quality of an image reproduced as part of the decoration. Furthermore, the matt finish reduces or eliminates reflections that may render the decoration difficult for a user to see.

In one embodiment, the drinking or eating vessel of the invention is dishwasher resistant. By way of example, the decorative layer may be resistant to at least 250, 300, 400, 500, 600, 700, 750, 800 or 1000 dishwasher cycles. Tests for assessing the dishwasher resistance of drinking or eating vessels are known to a skilled person; for example, British Standard BS EN 12875-4:2006, "Mechanical dishwashing resistance of utensils".

The degree of matt finish displayed by the vessels of the invention may be altered by varying the amount of matting agent present in the polymeric coating. A low amount of matting agent will produce a finish that retains some properties of reflectivity, whereas a high amount of matting agent will produce a finish that is very matt with no reflectivity. If too little matting agent is present, then the vessel will not display any of the advantages discussed above. Alternatively, if an excessive amount of matting agent is used, then the surface texture of the vessel may become too rough, making the vessel prone to marking and attracting dirt.

The present inventors have found that an optimum matt finish may be achieved when the matting agent is present in the polymeric coating at a concentration of between approximately 20 and 100 parts per 1000 (equivalent to approximately 20 to 100 grams of matting agent per litre of coating mixture), for example between approximately 40 and 80 parts per 1000. In one embodiment, the matting agent is present in the polymeric coating at a concentration of approximately 60 parts per 1000 (approximately 60 grams matting agent per litre of coating mixture).

In one embodiment, the matting agent comprises (or consists of) silica particles. For example, the matting agent may comprise (or consist of) precipitated silica, or the matting agent may comprise (or consist of) fumed silica.

The precipitated silica may have undergone an after-treatment, for example with wax.

In one embodiment, the matting agent comprises (or consists of) precipitated silica having an average particle size of approximately 2-20 µm, for example approximately 2-16 µm, 2-12 µm, 2-10 µm, 4-12 µm, 4-10 µm, 4-8 µm, or 5-6 µm. In one embodiment, the matting agent comprises (or consists of) precipitated silica having an average particle size of approximately 2, 4, 6, 8, or 10 µm.

In one embodiment, the matting agent comprises (or consists of) fumed silica having an average particle size of 4-8 (e.g. 5-6)µm.

In one embodiment, the term "average particle size" refers to average agglomerate particle size $d_{50}$ as measured by laser diffraction.

An example of a suitable silica matting agent is ACEMATT® OK 412 [CAS-No. 112926-00-8 (ex 7631-86-9), 9002-88-4], a fine-grained precipitated silica after-treated with wax, having an average particle size of 6.3 µm, which is produced by Evonik Industries AG.

A further example of a suitable silica matting agent is ACEMATT® OK 607, a fine-grained precipitated silica after-treated with wax, having an average particle size of 4.4 µm, which is produced by Evonik Industries AG.

A further example of a suitable silica matting agent is SYLOID® ED 30, having an average particle size of 5.0-6.0 µm, a pH of 6.0-8.5, a pore volume of 1.8 ml/g and a surface treatment of 10% wax, which is produced by Neogene LLP, Watford, Hertfordshire, United Kingdom.

The coated vessels of the invention comprise a decorative layer. A decorative layer comprises a decoration which covers all or part of a surface (typically at least part of the outer and/or inner surface) of the vessel, and may provide an aesthetic effect for the user.

The decorative layer may be a pattern or an image such as a graphic image or a photographic image. The decorative layer may be coloured. Thus, by way of example, the decorative layer may comprise patterns, texts, logos, advertisements, or other designs (e.g. corporate branding or trademarks), or combinations thereof. The decorative layer may comprise an image or images, such as pictures or photographic images.

The decorative layer may cover part of a surface of the drinking or eating vessel. Alternatively, the decorative layer may cover all of a surface of the drinking or eating vessel. A decorative layer may be applied to an outer surface, or to an inner surface (or to both), of a drinking or eating vessel.

The decorative layer of the drinking or eating vessel forms a diffuse layer within the polymeric coating. Thus, upon application of the decorative layer to the coated vessel, the decorative layer may permeate the polymeric coating or be absorbed by the polymeric coating such that it forms a diffuse layer within the polymeric coating.

A suitable technique for producing a decorative layer in accordance with the invention is dye sublimation. In this technique, a sublimation paper (comprising a desired image such as a photograph) is prepared using, for example, organic inks (as described below in more detail). The sublimation paper is cut to a desired shape and tightly wrapped around a coated vessel, before being subjected to heat (in order to set or cure the ink), for example using a mug oven at a temperature of 180° to 220° C. or a heat press at a temperature of 180° to 200° C. for 2 to 3 minutes. This results in the inks becoming absorbed into the polymeric coating, to form a diffuse layer within said coating. By way of example, the inks may become gaseous and permanently dye the coating.

Advantageously, use of dye sublimation allows a decorative layer to be formed using techniques that do not require large manufacturing plants.

Any sublimation ink suitable for use on ceramic or glass may be used with the present invention.

An example of an ink suitable for use in a dye sublimation process is an organic (aqueous) ink. By way of example, the organic ink is an ink that is applied (e.g. sets or cures) at a temperature of up to 250° C., for example at a temperature of up to 222° C., or in the temperature range of 180-220° C.

Examples of such inks are available from Sawgrass Europe, Jubilee House, Hillsborough, Sheffield, S6 1LZ, United Kingdom. Examples may include Rotech Cyan, Magenta, Yellow, Black, Black Plus, Light Cyan, Light Magenta, and Light Black.

A further example of an ink suitable for use in dye sublimation is an ink-jet ink for transfer printing that is applied (e.g. sets or cures) at a temperature of up to 250° C., for example at a temperature of up to 220°, or in the temperature range 180-220° C. Examples of such inks are available from Sensient Imaging Technologies SA, Specialty Inks and Colors, ZI Riond-Bosson 8, 1110 Morges 2, Switzerland. An example of such an ink has the name S4 Subli Blue 770 (article No. 648770W).

In one aspect, the invention provides a process for producing a drinking or eating vessel having a decorative layer, wherein the vessel comprises an inner surface that defines a volume for receiving liquid or solid food and an outer surface that supports a polymeric coating and a decorative layer, said process comprising the steps of:

providing a coating mixture comprising a matting agent;

applying the coating mixture to the outer surface of the drinking or eating vessel;

curing the coating mixture to form a polymeric coating having an inner surface and an outer surface, said inner surface being in contact with the outer surface of the drinking or eating vessel; and applying an image to the outer surface of the polymeric coating using dye sublimation to form a decorative layer, wherein the decorative layer forms a diffuse layer within the polymeric coating.

In one embodiment, the coating mixture is cured at a temperature of less than 250° C., or at a temperature in the range of 150-300° C. (e.g. in the range of 180-240° C.).

The coating mixture may be cured for a period of time of between 1 and 30 minutes, for example, 5-25 minutes, 5-20 minutes, 5-15 minutes, or 5-10 minutes.

In certain embodiments, the curing process requires heat. The heat required for the curing process may be provided by, for example, infrared radiation (such as in an infrared oven), or by convection (such as in a convection oven). Alternatively, curing may be effected by air in a process of air curing.

In one embodiment, the coating mixture comprises the matting agent in an amount of approximately 20 to 100 grams of matting agent per litre of coating mixture, for example approximately 40 to 80 grams per litre, or approximately 50 to 70 grams per litre. In one embodiment, the coating mixture comprises the matting agent in an amount of approximately 60 grams per litre.

In one embodiment, the coating mixture does not comprise anti-microbial particles. In one embodiment, the polymeric coating does not comprise any anti-microbial agent. In one embodiment, the polymeric coating does not have anti-microbial properties.

The polymeric coatings, matting agents and decorative layers described herein with reference to the drinking or eating vessel apply equally to the process aspect of the invention.

In one further aspect, the invention provides a drinking or eating vessel obtainable by a process as described herein.

The temperature values/ranges described herein with reference to the drinking or eating vessel aspect apply equally to the coating step of the process aspect.

Reference herein to "liquid or solid food" embraces any item that a mammal (e.g. a human) might drink or eat. Said item may have any (including zero) calorific value.

Reference herein to "an inner surface that defines a volume for receiving liquid or solid food" embraces any structure that is capable of supporting a liquid or solid food item. Said structure may include plates and plate-like articles of manufacture (whether flat or curved in vertical cross-section), and bowls or bowl-like articles of manufacture (whether capable of retaining liquid or not).

Reference herein to "supports" simply indicates that a polymeric coating has been applied to the outer (and/or inner) surface of the vessel. Thus, the polymeric coating may directly contact the outer (and/or inner) surface and/or may be separated therefrom by one or more intervening layers/coatings.

Embodiments of the invention will now be described solely by way of example.

EXAMPLE 1

A coating mixture comprising a matting agent is prepared by blending precipitated silica into a coating mixture at a concentration of approximately 60 grams matting agent per litre of coating mixture. In this example, ACEMATT® OK 412 silica matting agent is mixed with DuraGlaze™, and epoxy resin.

The coating mixture as prepared is applied to a drinking vessel (a ceramic mug) using a High Volume Low Pressure spray.

The coating mixture is cured onto the mug using heat at a temperature of 180-240° C. for 15-20 minutes.

The coated mug is allowed to cool.

A desired photographic image is printed onto a sublimation paper. The sublimation paper is cut to the desired size and shape and is tightly wrapped around the cured mug and heated in a mug oven at a temperature in the range of 180° to 220° C. During the heating process the inks become gaseous and permanently dye the DuraGlaze™ coating.

The assembly is allowed to cool, following which the sublimation paper is removed from the mug, leaving the image formed on the mug as a decorative layer.

The decorative layer has a matt appearance and is resistant to abrasion. The mug can be washed in a dishwasher for at least 750 cycles with no significant deterioration of the decorative layer.

EXAMPLE 2

Example 2 is as Example 1 above, with the exception that the step of heating the sublimation paper is carried out using a heat press at a temperature of 180° to 200° C. for 2.5 to 3.0 minutes.

The invention claimed is:

1. A drinking or eating vessel comprising an inner surface that defines a volume for receiving liquid or solid food and an outer surface that supports a polymeric coating and a decorative layer;
wherein the polymeric coating comprises a polymer formed by curing a coating mixture on the outer surface of the drinking or eating vessel, said coating mixture comprising a matting agent;
the matting agent comprises silica particles;
the polymeric coating has an inner surface in contact with the drinking or eating vessel and an outer surface exposed to contact by a user of the vessel; and
the decorative layer forms a diffuse layer within the polymeric coating.

2. The drinking or eating vessel of claim 1, wherein the matting agent comprises precipitated silica.

3. The drinking or eating vessel of claim 1, wherein said vessel comprises ceramic and/or glass.

4. The drinking or eating vessel of claim 1, wherein the polymeric coating comprises: (i) a polymer selected from: a polyurethane, an epoxy, an acrylic, or mixtures thereof; and (ii) said matting agent.

5. The drinking or eating vessel of claim 1, wherein the decorative layer is formed by dye sublimation.

6. A process for producing a drinking or eating vessel having a decorative layer, wherein the vessel comprises an inner surface that defines a volume for receiving liquid or solid food and an outer surface that supports a polymeric coating and a decorative layer, said process comprising the steps of:
providing a coating mixture comprising a matting agent;
applying the coating mixture to the outer surface of the drinking or eating vessel;
curing the coating mixture to form a polymeric coating having an inner surface and an outer surface, said inner surface being in contact with the outer surface of the drinking or eating vessel; and
applying an image to the outer surface of the polymeric coating using dye sublimation to form a decorative layer, wherein the decorative layer forms a diffuse layer within the polymeric coating,
wherein the matting agent comprises silica particles.

7. The process of claim 6, wherein the matting agent comprises precipitated silica.

8. The process of claim 6, wherein the coating mixture comprises the matting agent in an amount of 10-100 grams per litre of coating mixture.

9. The process of claim 6, wherein the coating mixture comprises the matting agent in an amount of 60 grams per litre of coating mixture.

10. The process of claim 6, wherein the coating mixture is applied by spray coating or by dip coating.

11. The process of claim 6, wherein the coating mixture is cured at a temperature of less than 600° C.

12. The process of claim 6, wherein the coating mixture is cured at a temperature in the range of 180-240° C.

13. The process of claim 6, wherein the polymeric coating comprises: (i) a polymer selected from: a polyurethane, an epoxy, an acrylic, or mixtures thereof; and (ii) said matting agent.

14. The drinking or eating vessel of claim 1, wherein the concentration of the matting agent is at least 20 g/L of coating mixture.

15. The drinking or eating vessel of claim 1, wherein the concentration of the matting agent is at least 60 g/L of coating mixture.

16. The drinking or eating vessel of claim 1, wherein the matting agent comprises particles having an average particle size of 2-20 μm.

17. The drinking or eating vessel of claim 1, wherein the matting agent comprises particles having an average particle size of 4-8 μm.

18. The drinking or eating vessel of claim 1, wherein the matting agent comprises silica particles, the polymeric coating comprises: (i) a polymer selected from: a polyurethane, an epoxy, an acrylic, or mixtures thereof; and (ii) said matting agent, and the concentration of the matting agent is at least 50 g/L of coating mixture.

19. The drinking or eating vessel of claim 1, wherein the polymeric coating does not include an anti-microbial agent.

* * * * *